Jan. 12, 1971  S. ZAROMB  3,554,810
METAL-OXYGEN POWER SOURCE

Filed April 12, 1967  2 Sheets-Sheet 1

INVENTOR.
Solomon Zaromb

INVENTOR.
Solomon Zaromb

United States Patent Office 3,554,810
Patented Jan. 12, 1971

3,554,810
METAL-OXYGEN POWER SOURCE
Solomon Zaromb, 376 Monroe St.,
Passaic, N.J. 07055
Continuation-in-part of applications Ser. No. 354,084,
Mar. 23, 1964, and Ser. No. 656,595, July 27, 1967.
This application Apr. 12, 1967, Ser. No. 633,348
Int. Cl. H01m 29/04
U.S. Cl. 136—86                                      6 Claims

ABSTRACT OF THE DISCLOSURE

A power source comprises a metal anode and an oxygen depolarized cathode at least partly enclosing a battery cell compartment, and a reversibly collapsible electrolyte storage reservoir, said collapsible reservoir being adapted to control the volume of electrolyte contained in said battery cell compartment and thereby to control the current density at the surface of said anode.

---

This invention relates to a metal-air battery, especially an aluminum-air battery, and to the apparatus and methods associated therewith.

This is a continuation-in-part of my co-pending application Ser. No. 354,084 filed Mar. 23, 1964, now abandoned, and of application Ser. No. 656,595 filed July 27, 1967. In said co-pending application I have disclosed one manner in which aluminum could be advantageously used as a practical anode "fuel" in metal-air batteries for driving electric automobiles or for powering lawn mowers, motor boats, and other devices.

It is the purpose of this invention to provide a simpler, more economical, and otherwise more practical aluminum-air battery for the aforementioned purpose.

Briefly, my invention consists of an aluminum-air battery assembly, wherein controlled electrochemical burning of aluminum to aluminum hydroxide is used to provide electrical energy, said burning being in part controlled by adjusting the electrolyte level and the electrolyte temperature within said battery assembly. The electrolyte temperature is adjusted by varying the rate of electrolyte circulation through a heat-exchanger or radiator and/or by altering the thermal insulation around the electrolyte-containing system. The electrolyte level is adjusted by changing the volume of one or more collapsible electrolyte reservoirs. Said flexible electrolyte reservoir or reservoirs is or are preferably situated directly beneath the battery assembly so as to facilitate settling of the battery reaction product into the reservoir or reservoirs. Compression of said reservoirs is preferably effected pneumatically by means of compressed air and a pressure regulating valve.

My invention is best explained with reference to the drawing, in which.

Figure 1:
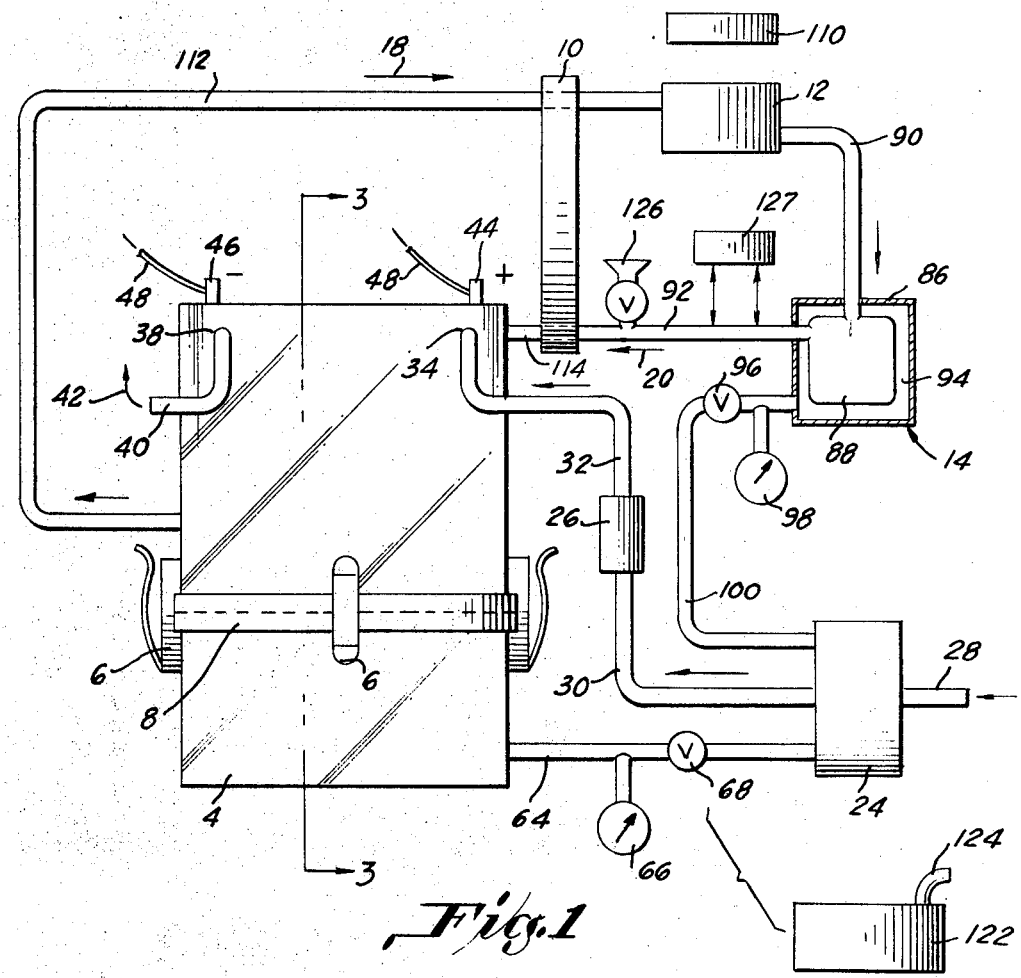
FIG. 1 is a schematic block diagram of the functional elements of one preferred embodiment of my aluminum-air fuel cell.

In FIG. 1 is shown a battery assembly 2 situated above an electrolyte container 4 and clamped onto said container by means of clamps 6. A rubber molding 8 around the upper rim of container 4 acts as a gasket preventing leakage of electrolyte from battery assembly 2 when the latter is clamped onto container 4.

During battery operation, an electrolyte consisting preferably of an aqueous solution of 10 to 30 weight percent KOH or NaOH is circulated by means of pump 10 from battery assembly 2 through a circuit comprising: an air-cooled heat exchanger 12, an auxiliary electrolyte reservoir 14, and each of the individual cell compartments 16 (see FIG. 3) of battery assembly 2, as indicated by arrows 18 and 20. At the same time air is caused to flow within cathode frames 22 (FIG. 3) of battery assembly 2 by means of air compressor 24. Said compressor sucks in ambient air at inlet 28 and forces it first through an air scrubber 26, via tube 30, and then through tube 32 into a manifold 34 supplying air to each of cathode sheets 22. The air exiting from said cathode sheets enters manifold 38 and exits through outlet tube 40 as indicated by arrow 42. Electric power from battery assembly 2 is drawn from terminals 44, 46 via electric cables 48. Part of said power is used to drive the electrolyte pump 10 and the air-compressor 24. Provision for manual air-pumping may also be included in compressor means 24 to permit manual priming of the power source without auxiliary electrical power.

Figure 5:
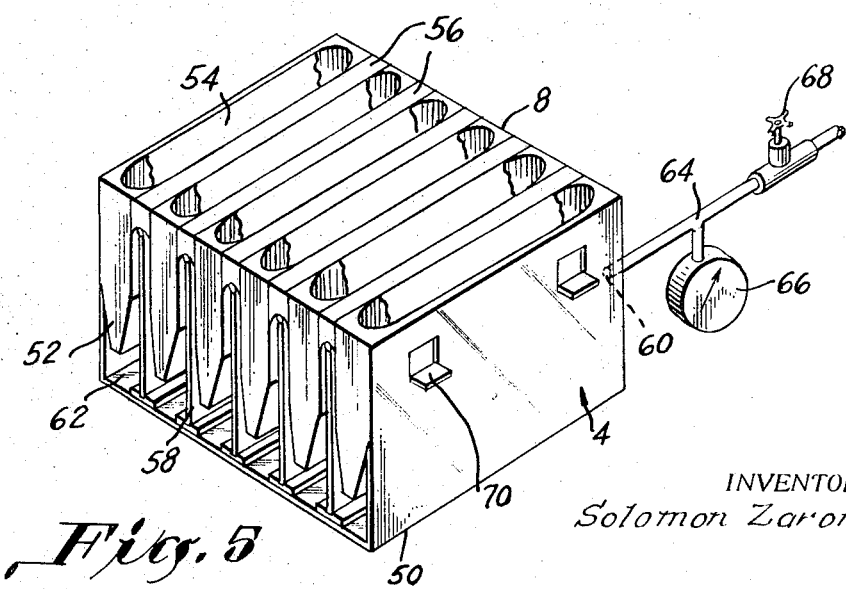
FIG. 5 illustrates an alternate version of electrolyte reservoir and precipitate collection means 4 of FIG. 1.

Electrolyte container 4 comprises an outer rigid shell 50, which may be of rigid plastic or of other rigid material, and of an inner lining 52, which may be of rubber or other flexible material chemically resistant to aqueous alkaline solutions. For improved perspective shell 50 is represented in FIG. 5 as being of transparent material such as polyacrylic resin. The lining 52 may comprise several pockets 54 with upper edges 56 supported by brackets 58 affixed onto the inner surface of outer shell 50. The space 62 between shell 50 and lining 52 is connected to a compressed air inlet 60, but is otherwise completely closed off by the molding 8 which also joins lining 52 to shell 50. Air inlet 60 is connected via an air hose 64 to a pressure gauge 66 and also via pressure regulating valve 68 to the air compressor 24.

Figure 3:
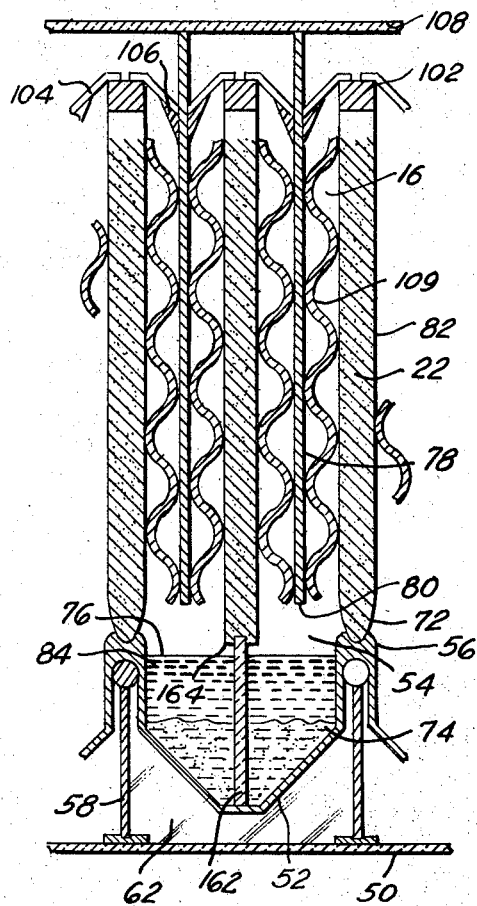
FIG. 3 is a partial schematic view of the vertical cross-section 3–3 of FIG. 1.

Container 4 may also comprise brackets 70 affixed to and around the upper outer portion of shell 50 to facilitate the clamping of container 4 onto the bottom of battery assembly 2. When in clamped position, the molding 8 forms part of the gasketing around the adjoining edges of battery assembly 2 and container 4. At the same time, the upper edges 56 of pockets 54 abut against the lower edges 72 of cathode frames 22. Pockets 54 thus form extensions of electrolyte compartments 16, as shown in FIG. 3. Pockets 54 may also be split into two sections by partitions 162 affixed to alternate cathode frame edges 164.

During periods of inaction the electrolyte level 76 is below the bottom edges of aluminum anodes 78, as shown in FIG. 3. In order to activate the power source, the electrolyte level 76 must be raised above said edges 80 in order to permit current to flow through the electrolyte between anodes 78 and air- or oxygen-depolarized cathodes 82. Such current flow gives rise to a battery discharge reaction involving consumption of aluminum, oxygen, and water and yielding aluminum hydroxide, $Al(OH)_3$. As the discharge reaction continues, the $Al(OH)_3$ reaction product precipitates out of the alkaline electrolyte and settles at the bottom of pockets 54 in form of a sludge 74.

To raise the electrolyte level to any desired height $h$ above the bottom of pockets 54 it suffices to increase the pressure $p$ within space 62 until it equals the electrolyte head corresponding to height $h$. E.g., for an electrolyte with a specific gravity of 1.2 grams cm.$^3$ and for a height $h=25$ cm., the pressure $p$ would equal to a head of around 30 cm. of water. Since the electrolyte level also determines the power output of the battery, the pneumatic control consisting of pressure regulating valve 68 and pressure gauge 66 provides a simple, light and economical means of controlling the power supply output.

The same pneumatic control also facilitates the removal of slude 74 from pockets 54 during the electrolyte replacement operation. This operation consists of: first reducing the pressure $p$ and allowing the electrolyte to drain into pockets 54, unclamping container 4 from battery assembly 2, inverting container 4 so as to dump out the old electrolyte and sludge (preferably over and into a precipitate collecting tank at a refueling station), increasing the pressure $p$ until pockets 54 are turned inside out so as to be freed of most of the precipitate, and then again reducing the pressure $p$, rinsing the pockets with water and/or fresh electrolyte, and finally filling pockets 54 with fresh electrolyte.

Container 4 in conjunction with pressure control valve 68 thus provide a simple means of achieving such multiple functions as electrolyte level control, power control, electrolyte storage, precipitate collection, precipitate removal, and electrolyte replacement.

The auxiliary electrolyte reservoir 14 may similarly consist of a rigid outer shell 86 and a collapsible inner lining 88. However, the latter need not comprise multiple pockets but may consist instead of a single compartment connected to inlet and outlet tubes 90 and 92. The volume contained within said compartment may again be varied by adjusting the pressure within the space 94 between lining 88 and shell 86 via a regulating valve 96 leading to compressor 24 via tubing 100, said pressure being measured by gauge 98.

The appropriate electrical connections between electrodes 78, 82 and battery terminals 44, 46 may be provided by a printed circuit board 102 which may also serve as a cover for battery assembly 2. Board 102 is firmly and accurately affixed over battery assembly 2 so as to provide good and solid electrical connections to cathodes 82, terminals 46, 48 and anode clamping contacts 104. Contacts 104 may also comprise wipers 106 serving to remove most of the electrolyte and aluminum oxide adhering to anodes 78 in cases where it is necessary to have said anodes withdrawn from the electrolyte compartments upon interruption of power output. Such withdrawals may be required to prevent the formation of a dry crust over the anodes upon interruption of service, and may be readily effected with the aid of an auxiliary movable anode holding jig 108. As may be seen from FIG. 3, withdrawal of anodes 78 through an upward motion of jig 108 relative to the fixed wipers 106 (which remain clamped against said anodes) results in a wiping action which separates loosely adhering matter from the surface of said anodes. Jig 108 may also serve to replace or re-immerse anodes 78. As these anodes are being consumed they may also be automatically pushed deeper into cell compartments 16 by weights or springs bearing down on jig 108.

Accidental electrical shorts between anodes and cathodes within battery cell compartments 16 are prevented by spacers 109 made of a resilient electrically insulating material which may be a resilient plastic or a well-insulated metal spring. The open and springlike structure of spacers 109 permits easy electrolyte flow in chambers 16 along anodes 78. Electrolyte circulation within chambers 16 is required to prevent excessive temperature build-up at the anode-electrolyte interface arising from the heat generated in the battery discharge reaction and possibly also in a parasitic corrosion reaction. I have found that said corrosion reaction is greatly accelerated at temperatures in excess of 50° C., but can be kept under control at lower temperatures provided that the current drawn from the battery corresponds to an appreciable anode current density, usually in excess of 20 milliamperes/cm.$^2$ and preferably in excess of 40 milliamperes/cm.$^2$. This discovery has opened the way to the production of practical and economical aluminum-air batteries, since it is a relatively easy matter to control the current density by controlling the electrolyte level, as described above, and it is also fairly easy to maintain the electrolyte temperature below 50° C. by circulating the electrolyte through radiator 12, and, if necessary, by accelerating the flow of ambient air across radiator 12 by means of an auxiliary air-blower 110.

To yield high power output at high current efficiency and energy efficiency the battery temperature should be preferably around 30° C. or within 5° thereof. Under these conditions the battery output is usually in the range of 1.1±0.3 volt/cell, and especially 1.1±0.15 volt/cell, at a current density of 20 to 100 milliamperes/cm.$^2$ and a current efficiency of better than 90%. At higher temperatures the parasitic corrosion reaction may become bothersome, whereas at lower temperatures the power output tends to fall off. Therefore, in order to maintain the temperature within or near the optimum range the following adjustable features should be preferably provided for:

(a) Adjustment of the rate of electrolyte circulation through variation of power supply to pump 10; and (b) Adjustment of the cooling efficiency of radiator 12 through variation of power supply to blower 110 and/or adjustment of air louvers (not shown) around radiator 12; and (c) In cold climates or in case of occasional cold weather, adjustment of insulation and/or louvers around the entire system and introduction of warm electrolyte into chambers 16, said warm electrolyte being most readily produced by dissolving 1 part of dry KOH in two parts (by weight) of water in an auxiliary reservoir 122. The contents of reservoir 122 may be poured into battery assembly 2 through a side arm 126. A gooseneck and/or hose connection 124 to reservoir 122 is also useful for rinsing and or flushing parts of the power source system with water and/or concentrated alkaline solutions whenever such need may arise.

In applications where peak power requirements may be much higher than the average power output, e.g., in motor vehicles requiring fast acceleration at high vehicle speed, the performance of the oxygen-depolarized cathodes may be boosted by injecting an appreciable amount of oxidant into the circulating electrolyte prior to its entry into its battery assembly 2. Said oxidant may be injected from oxidant supply 127 into tube 92. Oxidant supply 127 may comprise preferably a liquid oxidant such as a hydrogen peroxide solution, or else it may comprise a supply of pressurized oxygen which may be introduced into the electrolyte in the manner described in my co-pending application Ser. No. 598,582 filed Nov. 9, 1966.

With the foregoing provisions it becomes possible to bring the battery temperature and performance down or up to the optimum range under most of the usually encountered outdoor weather conditions.

The relatively low optimum operating temperature of 30±5° C. is economically advantageous in that it affords a longer battery life, since higher temperatures are known to accelerate the deterioration of most materials. It may also permit the use of relatively cheap catalyst materials in the oxygen-depolarized cathodes which may remain stable for considerable periods of time at a temperature of around 30° C. even though they would tend to deteriorate at a faster rate at higher temperatures. For instance, nickel carbide catalyst is known to deteriorate at temperatures above 70° C. The stabilization of this and of similar catalysts should be much easier to achieve at around 30° C.

Figure 4A:
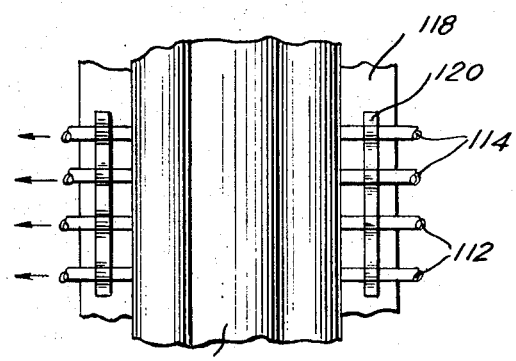
FIG. 4a is a plan view of FIG. 4.
Figure 4:
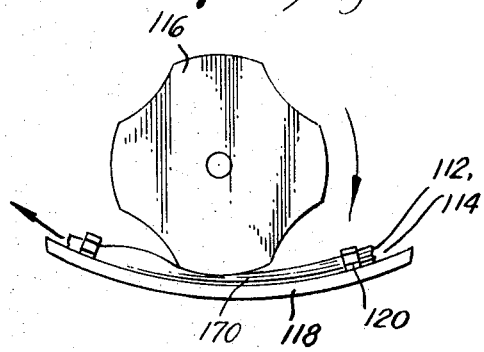
FIG. 4 is a partial schematic horizontal and vertical projection of pumping means 10 of FIG. 1.

In view of the importance of electrolyte circulation in ensuring proper temperature control and optimum battery performance, it is essential that said circulation be nearly uniform or at least comparable in each of the individual cell compartments 16. Moreover, in cases where some or all of the battery cells are electrically in series connection, it is necessary to prevent electrical leakage paths through the electrolyte circulation system between the series-connected cells. These requirements can be met by having separate outlets and inlets 114 for each individual cell compartment and having pumping means 10 operate simultaneously and independently on each of said outlets and inlets, as indicated diagrammatically in FIG. 4. Pumping means 10 is preferably of the peristaltic type, i.e., such that the pumping action is effected by a rotating cylindrical cam 116 pressing against flexible inlet and/or outlet tubes 112, 114 which are held in place by clamps 120 against a cylindrical support 118. The single cam 116 in conjunction with support 118 thus provides separate pumping for each cell compartment. In addition, the compressed portions 170 of tubes 112, 114 constitute interruptions in the electrical path through the electrolyte thus preventing leakage currents between series-connected cells.

The afore-described system may be varied, of course, in many ways without substantially altering the above-disclosed principles underlying satisfactory operation of aluminum-air power sources. For instance, the shapes of pockets 54, chambers 16 and electrodes 78, 82 may be tubular rather than rectangular.

Figure 2:
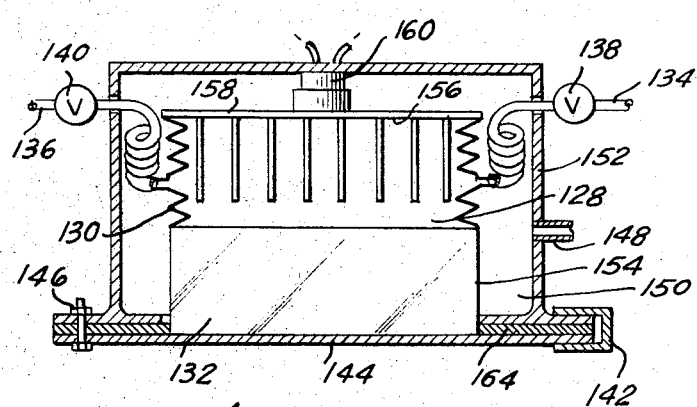
FIG. 2 is a diagrammatic cross-sectional view of one type of electrolyte container 4 of FIG. 1.

The main electrolyte reservoir and precipitate collection means may also operate in a position which may be remote from battery assembly 2, as in the embodiment shown in FIG. 2. In this embodiment or variation of my invention the electrolyte leaving the pumping system 10 is passed through collapsible chamber 128 comprising baffles 130. While describing a winding path around said baffles 130, the Al(OH)$_3$ precipitate carried by the circulating electrolyte settles down near the bottom of chamber 128 in form of a sludge 132. Such precipitate removal may also be assisted, if need be, by an auxiliary filtration and/or centrifugation means (not shown). In any case, the amount of Al(OH)$_3$ carried by the electrolyte leaving chamber 128 through outlet tube 136 must be considerably lower than that carried into chamber 128 via inlet tube 134. When the amount of precipitate collected in chamber 128 has become excessive, chamber 128 may be partly collapsed so as to displace most of the electrolyte therefrom, and tubes 134, 136 may be closed off by stopcocks or valves 138, 140. Clamp 142 may then be released so that the base plate 144 and gasket 164 could be swiveled sideways around pin 146 thus providing an open bottom through which sludge 132 may be emptied. Alternately, provision may be made for sliding instead of swiveling the base plate 144. To dislodge sludge 132 one may again apply pneumatic pressure via inlet 148 into the space 150 confined between rigid shell 152 and flexible lining 154 so as to turn said lining inside out. Alternately the top 156 of collapsible lining 154 may be threshed by plate 158, said plate being moved up and down by electromagnets 160.

In either case, the inlet and outlet tubes 134 and 136 are coiled inside space 150 so as to permit free downward displacement of lining 154.

While the preceding examples utilize primarily aluminum anodes, it is clear that other readily oxidizable metals such as zinc or magnesium may also be used in lieu of aluminum in the afore-described manner.

There will now be obvious to those skilled in the art many modifications and variations of my afore-outlined power source which, however, will not depart from the scope of my invention if outlined by the following claims.

I claim:

1. Power source comprising: at least one metal anode, at least on oxygen depolarized cathode at least partly enclosing a battery cell compartment, an aqueous electrolyte, electrolyte circulation means, precipitate collection means, a reversibly collapsible electrolyte storage means, and means for effecting a change in the volume of said collapsible storage means to produce a change in the volume of electrolyte contained in said cell compartment and thereby control the current density at the surface of said anode.

2. Power source as claimed in claim 1 comprising means for adjusting the temperature of said electrolyte so as to inhibit the corrosion of said anode while maintaining adequate power output from said power source.

3. Power source as claimed in claim 1 comprising means for emptying said precipitate collection means and electrolyte storage means, and means for replacing said electrolyte.

4. Power source as claimed in claim 1 wherein said electrolyte circulating means comprises means for interrupting any electrical circuit paths through the electrolyte channels leading to multiple separate battery cell compartments.

5. Power source as claimed in claim 1 wherein said means for effecting a change in volume is pneumatic.

6. Power source as claimed in claim 1 wherein said anode comprises aluminum.

References Cited

UNITED STATES PATENTS

| | | | |
|---|---|---|---|
| 757,637 | 4/1904 | Reid | 136—86 |
| 2,925,455 | 2/1960 | Eidensohn et al. | 136—86 |
| 3,014,976 | 12/1961 | Blackme | 136—86 |
| 3,043,898 | 7/1962 | Miller et al. | 136—86 |
| 3,294,587 | 12/1966 | Le Duc | 136—86 |
| 3,359,136 | 12/1967 | Merten et al. | 136—86 |
| 3,378,406 | 4/1968 | Rosansky | 136—86 |

ALLEN B. CURTIS, Primary Examiner

U.S. Cl. X.R.

136—160